(12) United States Patent
Bonanni et al.

(10) Patent No.: US 10,936,695 B2
(45) Date of Patent: Mar. 2, 2021

(54) COLLABORATION SYSTEM TO SHARE TAILORED INFORMATION WITH SOCIAL NETWORKS

(71) Applicant: International Business Machines Corporation, Armonk, NY (US)

(72) Inventors: Cristina Bonanni, Rome (IT); Giuseppe Ciano, Rome (IT); Gianluca Della Corte, Rome (IT); Antonio Di Cocco, Rome (IT); Alessandro Donatelli, Rome (IT); Filomena Ferrara, Rome (IT); Giuseppe Longobardi, Rome (IT); Antonio Sgro', Rome (IT)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 15/226,721

(22) Filed: Aug. 2, 2016

(65) Prior Publication Data

US 2018/0039644 A1    Feb. 8, 2018

(51) Int. Cl.
G06F 16/958    (2019.01)
G06F 16/93    (2019.01)

(52) U.S. Cl.
CPC .......... *G06F 16/958* (2019.01); *G06F 16/93* (2019.01)

(58) Field of Classification Search
CPC .. G06Q 30/02; G06Q 50/01; G06Q 10/06315; G06Q 20/12; G06Q 20/1235; G06F 2221/2115; H04L 2209/60
USPC .......... 707/733–734, 784, E17.06, E17.108, 707/733–734, E17.095, E17.102, 707/E17.116, 707–708, 736–738, 771
See application file for complete search history.

(56) References Cited

U.S. PATENT DOCUMENTS

| 8,645,991 B2* | 2/2014 | McIntire ............ H04N 7/17318 725/34 |
| 8,874,477 B2* | 10/2014 | Hoffberg .............. G06Q 10/103 705/37 |
| 9,177,060 B1 | 11/2015 | Bennett et al. |
| 9,213,996 B2 | 12/2015 | Pavlidis et al. |

(Continued)

FOREIGN PATENT DOCUMENTS

WO    2013019363 A1    2/2013

OTHER PUBLICATIONS

Walter Adamson, "Understanding Maturity Levels in Social Media Monitoring," Feb. 4, 2016, Which-50 Digital Intelligence, 8 pages.

*Primary Examiner* — Alex Gofman
*Assistant Examiner* — Linh Black
(74) *Attorney, Agent, or Firm* — Patterson + Sheridan, LLP

(57) ABSTRACT

Techniques are disclosed for distributing online content (e.g., news articles, blog posts, and the like) to a social media provider at a point in time determined based on topic maturity. One or more metrics are obtained from each of a plurality of social media providers. The metrics relate to a topic associated with a document for publishing on the social media providers. A measure is determined for each of the social media providers. The measure indicates when to publish the document on the social media provider based on the metrics associated with that provider. Upon determining that the measure exceeds a threshold for at least one of the social media providers, the document is published to the social media provider.

17 Claims, 6 Drawing Sheets

(56) References Cited

U.S. PATENT DOCUMENTS

| | | | |
|---|---|---|---|
| 9,396,483 B2* | 7/2016 | Hamedi | G06F 16/24578 |
| 10,002,365 B2* | 6/2018 | Heffernan | G06Q 30/0241 |
| 2005/0154702 A1* | 7/2005 | Liu | G06F 16/345 |
| 2006/0064411 A1* | 3/2006 | Gross | G06F 16/90324 |
| 2008/0097825 A1* | 4/2008 | Leach | G06Q 30/02 |
| | | | 705/37 |
| 2011/0213655 A1* | 9/2011 | Henkin | G06Q 30/0251 |
| | | | 705/14.49 |
| 2012/0296396 A1* | 11/2012 | Moffitt | A61N 1/36128 |
| | | | 607/59 |
| 2013/0073336 A1* | 3/2013 | Heath | G06Q 30/02 |
| | | | 705/7.29 |
| 2013/0085804 A1* | 4/2013 | Leff | G06Q 30/0219 |
| | | | 705/7.29 |
| 2013/0096981 A1* | 4/2013 | Evans | G06Q 30/06 |
| | | | 705/7.29 |
| 2013/0191394 A1* | 7/2013 | Bradley | G06F 16/9535 |
| | | | 707/738 |
| 2014/0081636 A1* | 3/2014 | Erhart | G06Q 50/01 |
| | | | 704/236 |
| 2014/0129324 A1* | 5/2014 | Spivack | G06Q 30/0269 |
| | | | 705/14.45 |
| 2014/0129331 A1* | 5/2014 | Spivack | G06Q 30/0269 |
| | | | 705/14.53 |
| 2014/0201227 A1 | 7/2014 | Hamilton-Dick et al. | |
| 2015/0052153 A1 | 2/2015 | Rubinstein et al. | |
| 2015/0207765 A1* | 7/2015 | Brantingham | H04L 51/046 |
| | | | 715/758 |
| 2016/0085753 A1* | 3/2016 | Wong | G06F 16/3322 |
| | | | 707/734 |
| 2018/0012630 A1* | 1/2018 | Thomee | G11B 27/036 |
| 2018/0268458 A1* | 9/2018 | Popa | G06K 9/00288 |

* cited by examiner

COLLABORATION SYSTEM TO SHARE TAILORED INFORMATION WITH SOCIAL NETWORKS

BACKGROUND

The present disclosure relates to social networking, and more specifically, to distributing online content (e.g., news articles, blog posts, and the like) to a social media provider at a point in time determined based on topic maturity.

Social networks allow users to share original content to a wide audience. For example, a writer on a news organization may published, on a social media provider (e.g., through an account belonging to the organization on the social media provider), an article for the user base of the social media provider to consume. Users may read the article and engage with other users on the social media provider, such as by commenting on the corresponding article post, re-publishing the article on a personal feed, and the like. Further, social networks are quite diverse. For example, a given social media provider may offer a variety of services that differs from services offered by another social media provider. In addition, some social media providers may be targeted towards different demographics of users (e.g., younger users, older users, users of a given region, etc.). Consequently, popular topics and issues that are discussed or presented on a particular social media provider often differ on another social media provider at any given point in time.

One aim for many users publishing content via social networks is wide dissemination across those networks. By doing so, a user can gain a wider audience and greater influence. However, strategically publishing content to reach a large audience presents several challenges. For example, as stated, a topic that is popular on a certain social media provider A may not be as popular on another provider B at a given point in time. Therefore, publishing an article related to that topic on social media provider B may reach relatively fewer users than if published on social media provider A. Further, popularity of a given topic can change over time, e.g., the topic on social media provider B may eventually gain traction among its users, and thus, more users may wish to read articles relating to that topic. As another challenge, a user often has to tailor the content to meet specific prerequisites of a given social network provider, e.g., adhering to character limits and minimum requirements, selecting user groups that have permissions to view the post including the published article, tagging requirements, and the like.

SUMMARY

One embodiment presented herein discloses a method. The method generally includes obtaining one or more metrics from each of a plurality of social media providers. The metrics relate to a topic associated with a document for publishing on the social media providers. The method also includes determining, for each of the social media providers, a measure indicating when to publish the document on the social media provider based on the metrics associated with that provider. Upon determining that the measure exceeds a first threshold for at least one of the social media providers, the document is published to the social media provider.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
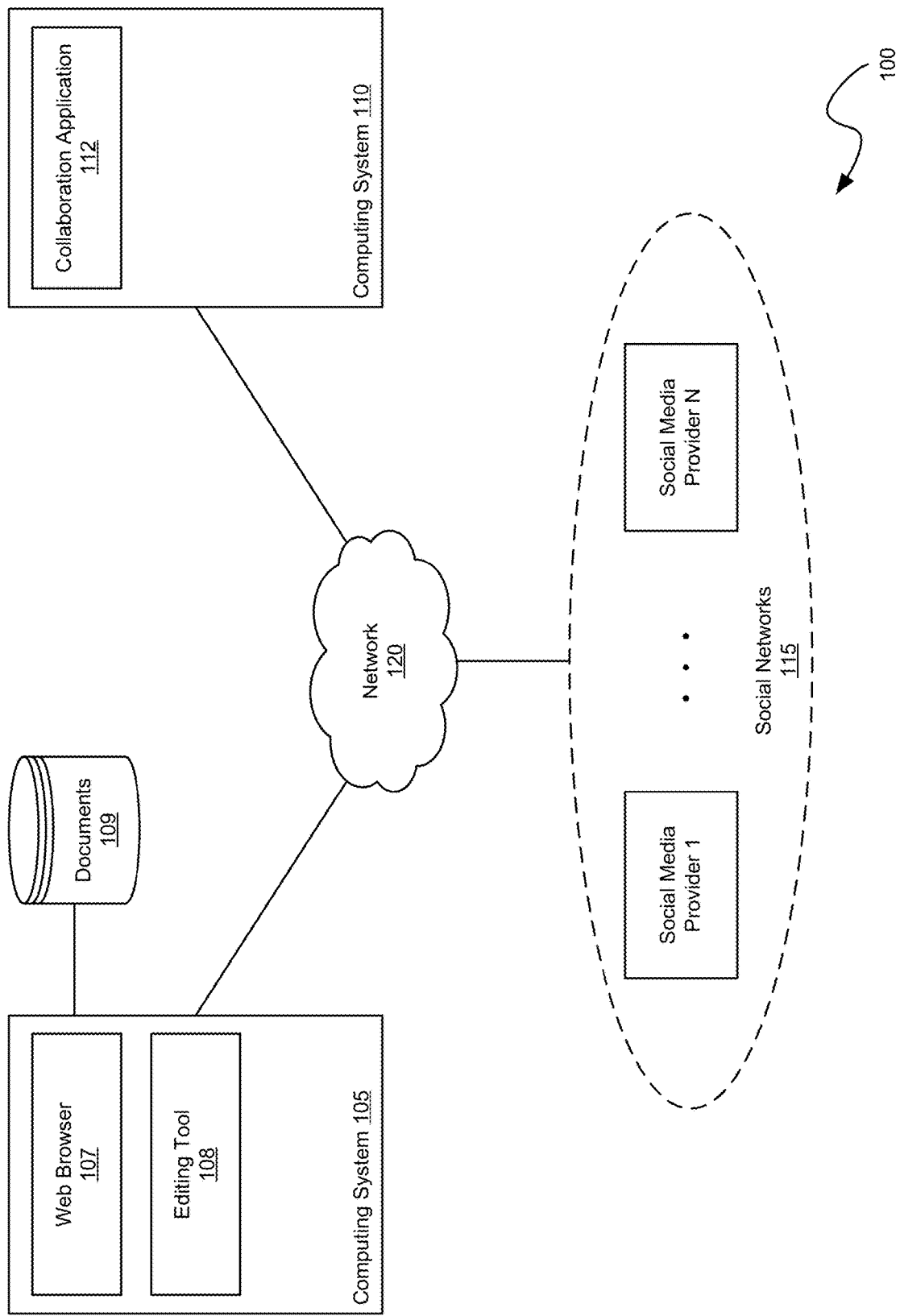
FIG. 1 illustrates an example computing environment, according to one embodiment.

Embodiments presented herein disclose techniques for publishing online content (e.g., a news article, blog post, press release, and other documents) to social networks. In particular, techniques evaluate topic maturity relating to the online content to identify appropriate social media providers as well as advantageous moments to publish the online content.

In one embodiment, a collaboration system receives a document from a user to publish to one or more social networks. The collaboration system may analyze the document content, e.g., by determining relevant sentences in the document, evaluating the sentences, and identifying topics to associate with the article. The collaboration system may then store the document in a database. The database serves as a container for containing the document until an identified point in time to publish the document.

In one embodiment, the collaboration system evaluates posts in different candidate social media providers for a given topic identified in the document. For example, the collaboration system may collect certain metrics (e.g., via APIs provided by each of the social media providers created for third-parties) relating to the topic. Example metrics include user sentiment (e.g., whether user-submitted posts about the topic are positive or negative), strength (e.g., a measure of likelihood that the topic is being discussed on the social media provider based on mentions of the topic on the provider), and reach (e.g., a range of influence of the topic based on an amount of users discussing the topic). The metrics allow the collaboration system to identify trends of the topic relative to a given social media provider.

Further, the collaboration system may determine one or more thresholds indicating a measure of maturity of a given topic on a social media provider. The collaboration system may determine the thresholds based on the collected metrics. For example, a first threshold may indicate that the topic is generating some traction on the social media provider but still a less than advantageous time to publish the article. A second threshold, higher than the first threshold, may indicate that trends relating to the topic are increasing, and thus, the article is ready for publishing on the social media provider. If the metrics, taken as a whole, exceed the second threshold, the collaboration system may publish the article to the social media provider (e.g., via an account associated with the user on the social media provider).

Advantageously, by evaluating a maturity of an underlying topic of the document on social networks, the collaboration system may identify a point in time during which a document, if posted to the identified social media provider(s), would reach a wide audience of users. That is, the collaboration system correlates various metrics such as user sentiment, strength, and reach for a given topic on a social media provider to establish maturity thresholds that can be used to identify such points in time. As a result, a user can potentially maximize engagement on the posted document.

Note, the following uses documents (e.g., articles, blog posts, press releases, etc.) as reference examples of online content that may be evaluated to determine specific topics relating to the documents. Of course, one of ordinary skill in the art will appreciate that embodiments presented herein may be adapted to a variety of content. For example, embodiments may be adapted to multimedia (e.g., audio, video, etc.). A collaboration system may identify topics from a given video stream based on metadata associated with the stream (e.g., artist name, geolocation, associated keyword tags) and assign the topics to the video stream. The collaboration system may then evaluate social media providers for metrics relating to the topics (e.g., user sentiment, strength, and reach) and determine thresholds for posting the video stream to an identified social media provider at a given point in time.

FIG. 1 illustrates an example computing environment 100, according to one embodiment. As shown, computing environment 100 includes a computing system 105, a computing system 110, and social networks 115, each interconnected via a network 120 (e.g., the Internet). In one embodiment, the computing system 105 can be a physical computing system, e.g., a desktop, laptop, tablet computer, mobile device, etc. In some cases, the computing system 105 may be a virtual computing instance, e.g., executing in a cloud network. Similarly, the computing system 110 may correspond to a physical computing system (e.g., a desktop computer, server in a data center, etc.) or a virtual computing instance in the cloud.

In one embodiment, the computing system 105 includes a web browser 107 and an editing tool 108. The web browser 107 allows an individual to access social networks 115, e.g., any of the social media providers 1-N with which the individual has a user account. For example, a given social media provider may include services that present user content to the individual via a user feed. The individual may view the content and engage with other users who also have access to the content. Users of the social media provider may write comments under posts containing the content, republish the content on their own user feeds, and the like. Such activity may propagate awareness of the content or underlying topics relating to the content across the social media provider, thus reaching a greater number of users on the social media provider.

Further, the editing tool 108 provides an interface through which the individual can compose or edit content, e.g., one or more documents 109. For example, the documents 109 may include an article to be posted on a news website, an entry to post on a blog, etc. Documents 109 may also include content to post directly on a given social media provider. In some cases, the editing tool 108 may be integrated with the web browser 107. In addition, a given social media provider may provide its own interface that allows a user to perform similar tasks as the editing tool 108 on that social media provider, where a local copy of the document 109 is stored on the computing system 105.

In one embodiment, the computing system 110 includes a collaboration application 112. The collaboration application 112 may receive (or monitor the composition of via an application programming interface (API) hook on the editing tool 108) a given document 109 along with a request to publish the document 109 to one or more of the social media providers 1-N (e.g., with which an individual has a user account). As will be further described below, the collaboration application 112 is configured to identify a point in time where interest in an underlying topic (or topics) on one or more social media providers is above a measure of maturity. In one embodiment, the maturity measure may be based on a variety of metrics relating to the topic on each social media provider.

For example, the metrics can include a measure of reach in a given social media provider for the topic. Reach may indicate a range of influence of the topic on the social media provider. For instance, reach may be based on distinct users discussing the topic relative to a total number of users of the social media provider. Another example is topic strength, which indicates a measure of likelihood that the topic is being discussed on the social media provider, based on mentions of the topic (or terms synonymous or relating to the topic) on the social media provider. Yet another example is user sentiment, which measures a user's reception to a particular topic, based on positive or negative terms used in posts discussing the topic. Of course, the collaboration application 112 may use other examples in determining a measure of maturity for a topic, such as length of time that the topic has been discussed by at least a specified amount of distinct users on the social media provider.

In one embodiment, the collaboration application 112 may use the metrics to calculate one or more thresholds for the maturity measure. Each threshold may indicate a measure of maturity for the given topic. For example, a first threshold, e.g., a low watermark, may indicate that the topic is being discussed with a degree of interest on a given social media provider, but is not high enough to warrant posting. A second threshold, e.g., a high watermark, may indicate that interest in the topic is relatively high and sustained.

The collaboration application 112 may use the thresholds to identify a point in time to publish the document 109 having the underlying topic. For example, the collaboration application 112 may determine to publish the document 109 once the maturity measure exceeds the second threshold. As another example, the collaboration application 112 may determine to publish a brief summary of the document 109 once the maturity measure exceeds a first threshold, so as to "fish" interest in the topic on the social media provider.

Figure 2:
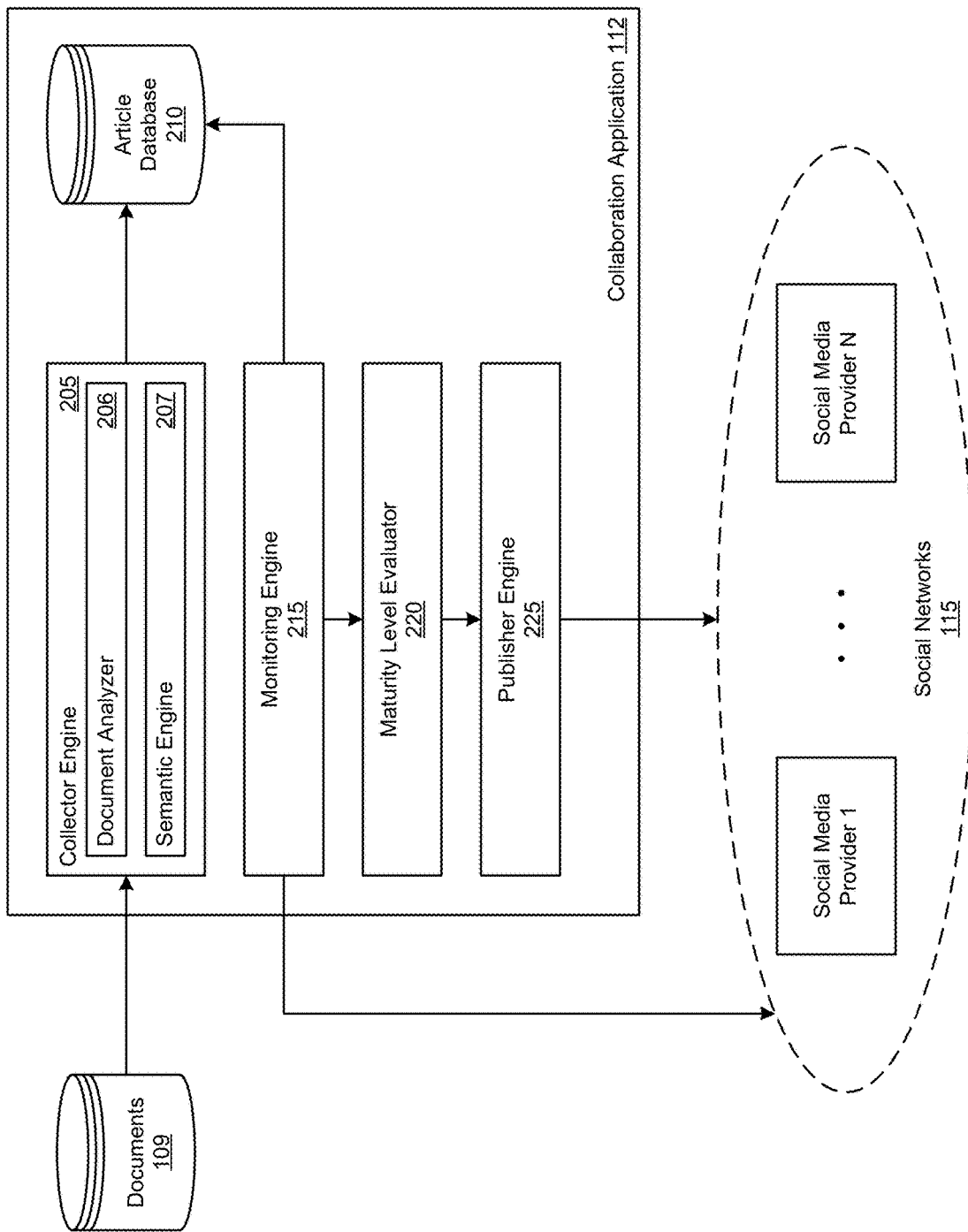
FIG. 2 further illustrates the collaboration application described relative to FIG. 1, according to one embodiment.

FIG. 2 further illustrates the collaboration application 112, according to one embodiment. As shown, the collaboration application 112 includes a collector engine 205, a monitoring engine 215, a maturity level evaluator 220, a publisher engine 225, and an article database 210. The collector engine 205 itself includes a document analyzer 206 and a semantic engine 207.

In one embodiment, the collector engine 205 generally tags content of a document 109, and, once finalized, stores the document 109 in a container (e.g., in the article database 210) for eventual publishing to a social media provider. The document analyzer 206 extracts text at each level of the document 109 (e.g., header, body, summary, etc.). The document analyzer 206 may also extract metadata associated with the document 109. Further, the document analyzer 206 may format the extracted data and organize the text, e.g., by level, according to metadata, etc. In one embodiment, the semantic engine 207 may use natural language processing (NLP) techniques to determine topics and keywords to associate with the text. Further, the semantic engine 207 may tag the document 109 with the keywords and topics. Once evaluated, the collector engine 205 may send the document 109, document tags, and a provided summary of the document to the article database 210. In one embodiment, the article database 210 is a data store that maintains articles and metadata associated with each article (e.g., tags, summary information, etc.). In some cases, a document 109 might not include a user-provided summary. In such a case, the collector engine 205 may automatically generate a summary to include with the document 109. For example, the collector engine 205 may identify, in the sentences extracted from the document analyzer 206, relevant statements that should be included in the summary. To do so, for instance, the semantic engine 207 may apply NLP techniques to score a relevance of certain sentences or passages in the document 109. The collector engine 205 may then include one or more highly relevant sentences (e.g., sentences having a score exceeding a threshold) into the summary.

In one embodiment, the monitoring engine 215 observes available social media providers to which to publish the document 109. For instance, the monitoring engine 215 may do so via an API provided by the social media provider for third-party developers. As another approach, the monitoring engine 215 may directly archive and index posts published to the social media provider. As stated, the monitoring engine 215 may calculate one or more metrics observed on each of the social media providers, e.g., reach, strength, and user sentiment. Based on a semantic analysis of posts published to the social media provider, the monitoring engine 215 may validate a sentiment for the underlying topic. If the sentiment is generally positive (e.g., terms associated with posts discussing the topic are positive), the monitoring engine 215 may pass on the sentiment metric to the maturity level evaluator 220. Further, based on a syntactic analysis of the strength of the topic (e.g., a number of times a given term, or phrase recurs over a total number of posts monitored on the social media provider), the monitoring engine 215 may forward the strength metric to the maturity level evaluator 220. Further still, based on a number of distinct individual posts discussing a topic, the monitoring engine 215 may forward the reach metrics to the maturity level evaluator 220. In addition, the monitoring engine 215 may identify trends of a given topic in a social media provider based on these metrics.

In one embodiment, the maturity level evaluator 220 receives metrics and trend data from the monitoring engine 215. Generally, the maturity level evaluator 220 evaluates a maturity measure to determine whether to publish the document 109 or wait to do so (e.g., until the measure of maturity increases). The maturity level evaluator 220 may analyze an affinity of certain topics discussed in a given moment in the social media provider based on the metrics and trends. Doing so results in a measure of maturity for the topic used to determine whether to post the document 109 to the social media provider. The monitoring engine 215 may then evaluate a slope of the trend (e.g., which may be derivative of a number of topics respective to time) to further reinforce the maturity measure of the topic in the social media provider.

In one embodiment, the publisher engine 225 receives publishing decisions from the maturity level evaluator 220 for posting a document 109 to a given social media provider. For example, the publisher engine 225 may use provider-specific APIs to access functions for publishing the document 109 to the social media provider on behalf of the individual. In addition, in cases where the measure of maturity has not yet reached a given threshold but is at a point where the topic has begun to mature on the provider, the publisher engine 225 may instead publish a summary associated with the document 109 to the social media provider. Doing so allows the collaboration application 112 to "fish" for more interest in the topic, thereby eventually increasing the measure of maturity.

Figure 3:
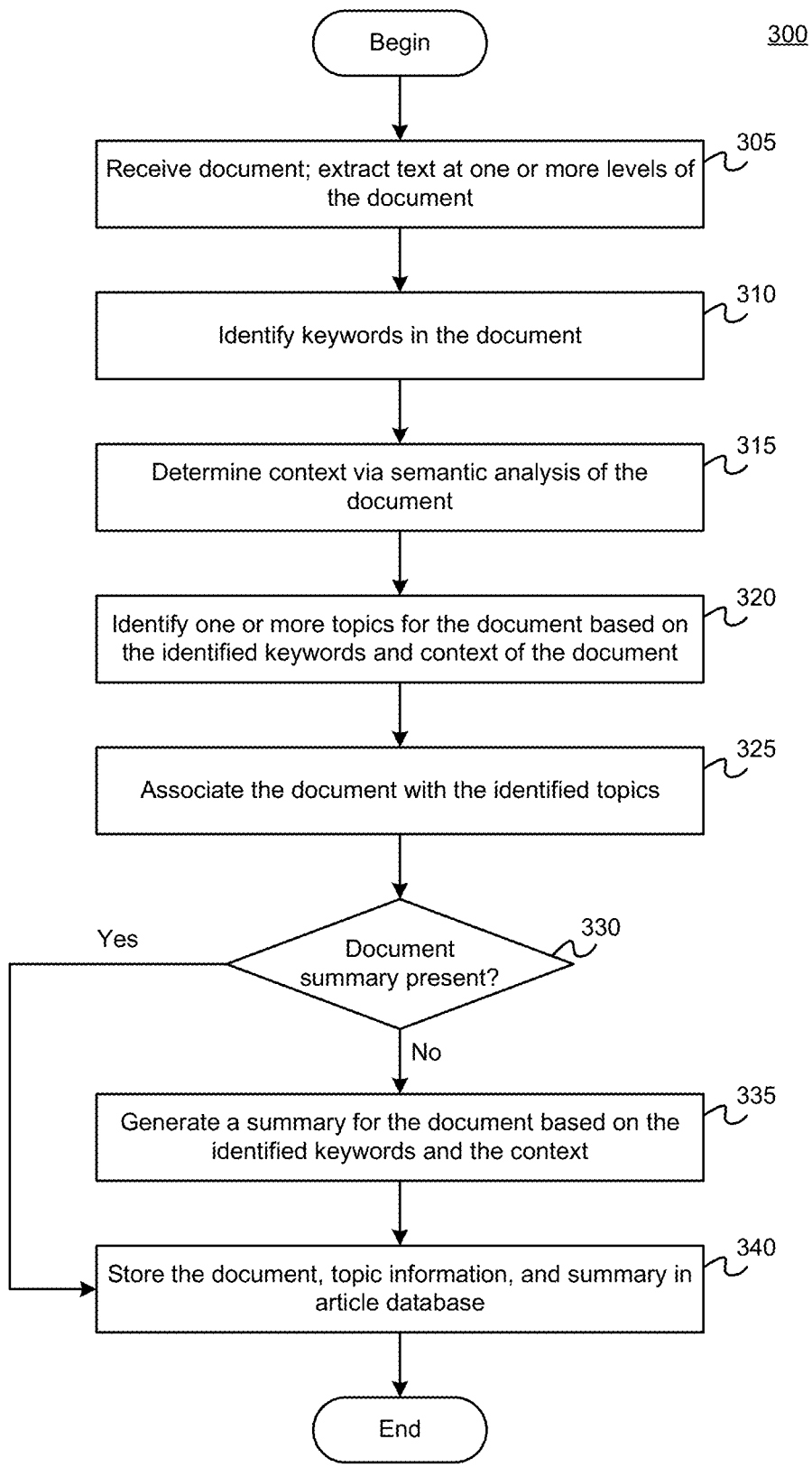
FIG. 3 illustrates a method for collecting documents for publishing on one or more social networks, according to one embodiment.

FIG. 3 illustrates a method 300 for collecting documents (e.g., a document 109) for publishing on one or more social networks, according to one embodiment. In particular, method 300 discusses the collector engine 205 obtaining a document 109 and storing the document 109 in the article database 210 for subsequent publishing.

As shown, method 300 begins at step 305, where the collector engine 205 receives a document 109 for posting to social networks 115. In one embodiment, the document 109 may also accompany metadata and account information for signing on to the one or more social networks 115. In addition, the document 109 may be organized in several levels, e.g., providing a header, body, summary, and the like. Once received, the document analyzer 206 extracts text at each level of the document 109. The document analyzer 206 may associate each portion of the extracted text with the corresponding level from which the text was extracted.

At step 310, the semantic engine 207 identifies keywords in the document 109. For instance, the semantic engine 207 may do so by parsing the extracted text and identifying, e.g., frequently recurring terms throughout the text. Of course, the semantic engine 207 may identify the keywords based on other NLP techniques. At step 315, the semantic engine 207 determines a context of the document 109, e.g., using NLP techniques, analyzing the keywords relative to other text in the document 109, and the like.

At step 320, the semantic engine 207 identifies one or more topics with which to associate the document 109. To do so, the semantic engine 207 may determine the topics based on the identified keywords and context. Once identified, at step 325, the collector engine 205 associates the identified topics with the document 109. For example, the collector 205 may generate tag metadata for the document 109, with each tag specifying one of the identified topics.

At step 330, the document analyzer 206 determines whether a summary is included with the document 109. If so, then the method 300 proceeds to step 340. Otherwise, the collector engine 205 generates a summary to include with the document 109 (at step 335). To do so, the collector engine 205 may use NLP techniques to determine relevant sentences to include from the document 109. At step 340, the collector engine 205 stores the document 109, topic information (e.g., tag metadata), and document summary to the article database 210.

Figure 4:
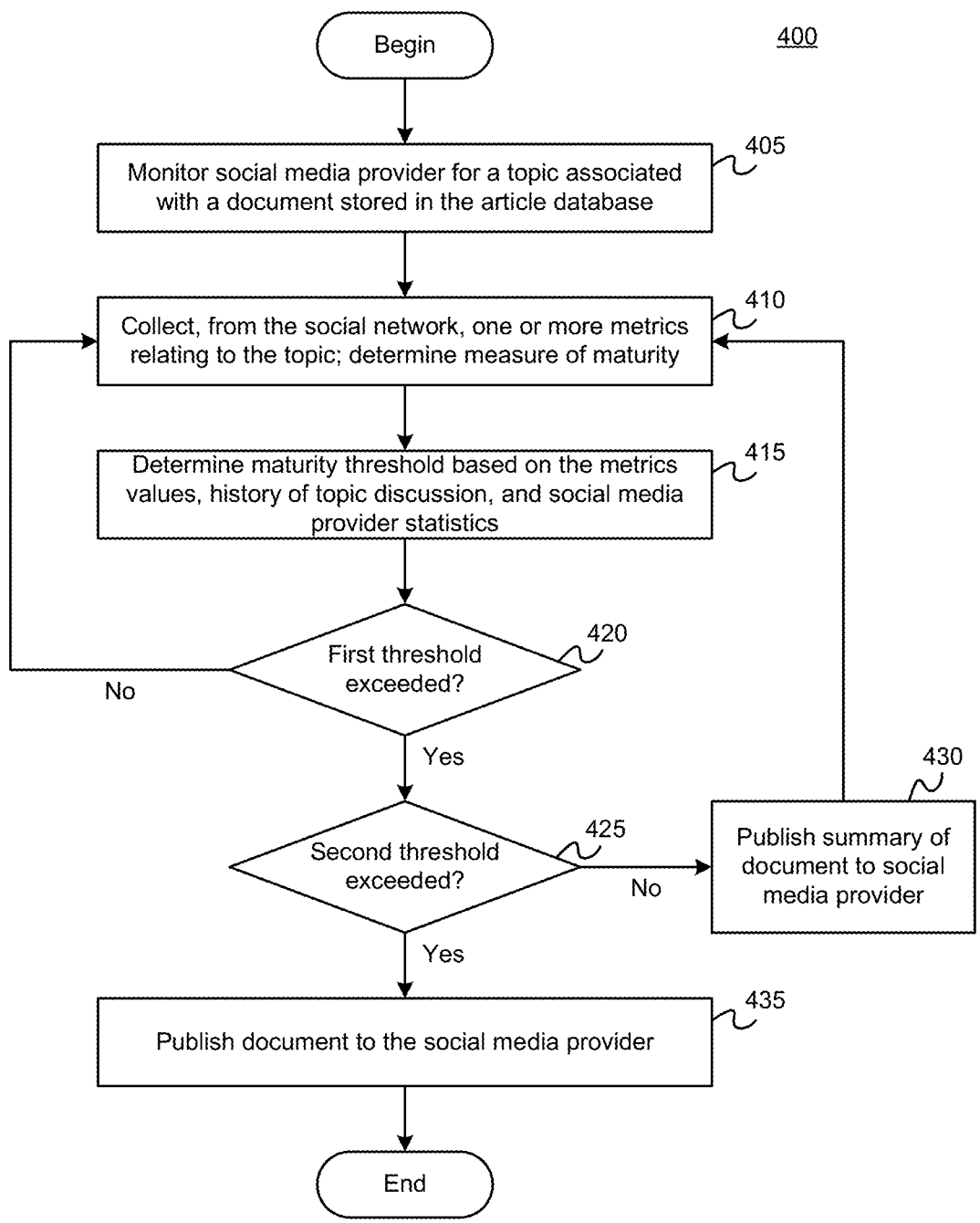
FIG. 4 illustrates a method for publishing a document to a social media provider based on maturity of an underlying topic on the social media provider, according to one embodiment.

FIG. 4 illustrates a method 400 for publishing a document 109 to a social media provider based on maturity of an underlying topic on the social media provider, according to one embodiment. As shown, the method 400 begins at step 405, where the monitoring engine 215 observes a given social media provider for a topic relating to a given document 109. As stated, the monitoring engine 215 may do so using a provider-specific API that allows third parties to access API functions for receiving such data on the social media provider.

At step 410, the monitoring engine 215 collects one or more metrics relating to the topic from the social media provider. As stated, such metrics can include user reach, sentiment, and topic strength. The monitoring engine 215 may evaluate each of the metrics against corresponding thresholds (e.g., whether topic mentions across the social media provider has exceeded x amount of messages) and send metrics exceeding those thresholds to the maturity level evaluator 220. In turn, the maturity level evaluator 220 may calculate a measure of maturity based on the collected metric data.

At step 415, the maturity level evaluator 220 determines a maturity threshold based on the collected metrics, history of the topic being discussed on the social media provider, and other social media provider statistics. For example, the maturity level evaluator 220 may define a first threshold that indicates that a given topic is starting to become mature on the social media provider. The maturity level evaluator 220 may also define a second threshold that indicates that a given topic has matured on the social media provider based on the metrics observed.

At step 420, the maturity level evaluator 220 determines whether the maturity measure exceeds the first threshold. If not, then the method 400 returns to step 410, where the monitoring engine 215 collects additional metric data. Otherwise, at step 425, the maturity level evaluator 220 determines whether the maturity measure exceeds a second threshold. If not, then at step 430, the publisher engine 225 retrieves a summary associated with the document 109 and posts the summary to the social media provider on behalf of the individual. Doing so effectively "fishes" for more interest in the topic, which results in an increased maturity measure. Otherwise, if the second threshold is exceeded, then at step 435, the publisher engine 225 posts the document 109 to the social media provider. For example, the publisher engine 225 may post the document itself via provider-specific APIs. Doing so allows the publisher engine 225 to meet certain posting requirements for the social media provider. For example, some social media providers may require that a post be confined within a certain character limit. In such a case, the publisher engine 225 may use an API function that posts a link to the document 109 (e.g., hosted on an external site) as well as some description, such as a title of the document 109 or a summary.

As an example, assume that an individual has written an article discussing chocolate and the importance of milk as an ingredient for chocolate as a topic. The monitoring engine 215 may provide information regarding two social media providers in which milk, as a topic, is gaining popularity. For instance, in the first social media provider, the topic may be in the context of milk being used as a food. And on the second social media provider, the topic may be in the context of milk being in the context of cake making. In this example, also assume that the maturity measure is evaluated as low in the first social media provider, where milk is cited several times but chocolate is mentioned in fewer instances. In contrast, the maturity measure may be evaluated as exceeding a maturity threshold for the second social media provider. In this case, the publisher engine 220 may publish the article on the second social media provider. However, as for the first social media provider, the publisher engine 220 may publish a summary of the article if a first threshold indicating an interest in the topic is exceeded.

Figure 5:
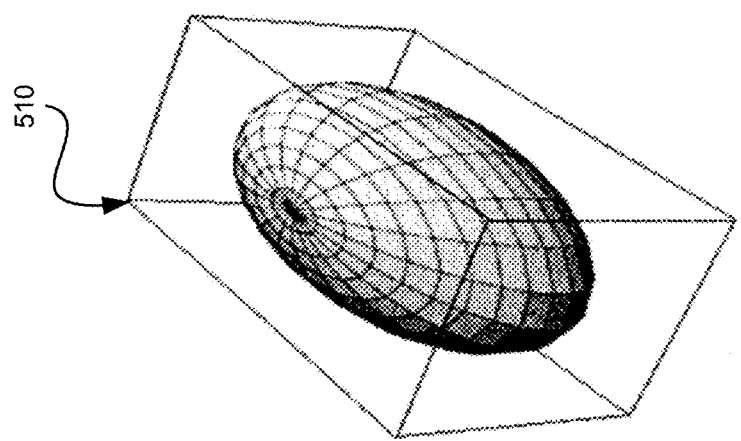
FIG. 5 illustrates an example graphical representation of thresholds used to identify a maturity of a given topic on a social media provider, according to one embodiment.
Figure 5:
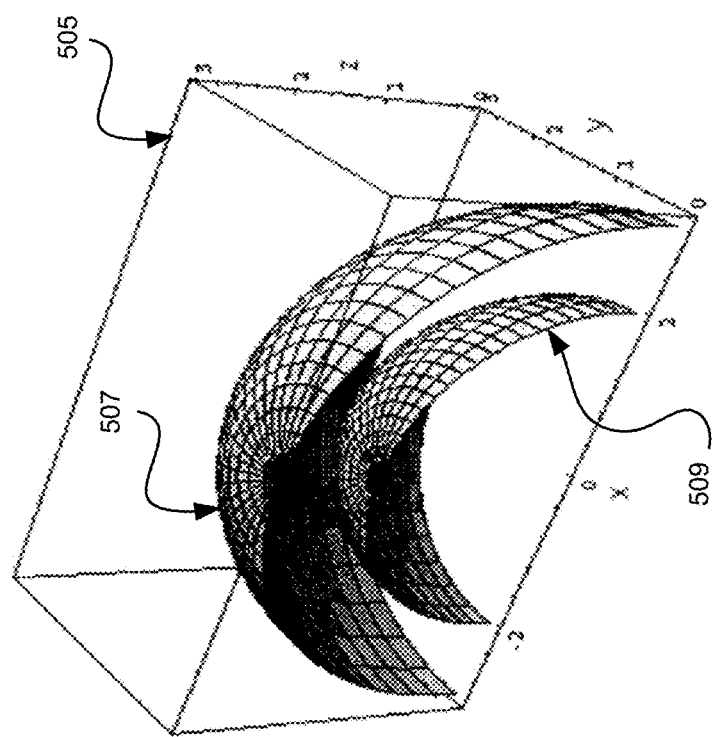

FIG. 5 illustrates an example graphical representation of thresholds used to identify a maturity of a given topic on a social media provider, according to one embodiment. In one embodiment, the collected metrics may be represented in an n-dimensional space, where n is the number of metrics collected. For example, assume that the collaboration application 112 collects metrics based on sentiment, strength, and reach. In such a case, the metrics, based on the topic history on a given social network provider and other statistics, may be represented as a sphere 505 or an ellipsoid 510. Each of the sphere 505 and the ellipsoid 510 identifying a portion of space based in the coordinate values representing the metrics.

In this example, the surface of each the sphere 505 and the ellipsoid 510 represents intersections of values for the three metrics where values above that surface indicate that the corresponding topic has matured, i.e., a threshold indicating maturity for the topic. Further, different layers under the surface may represent thresholds below the maturity threshold. For instance, the surface 507 of the sphere 505 may represent the maturity threshold, whereas the surface 509 of the sphere 505 represents another threshold that indicates that interest is building for the topic. Therefore, in cases where a maturity measure value falls between the surface 507 and the surface 509, the publisher engine 225 can post a summary associated with the document 109 to "fish" for interest.

Figure 6:
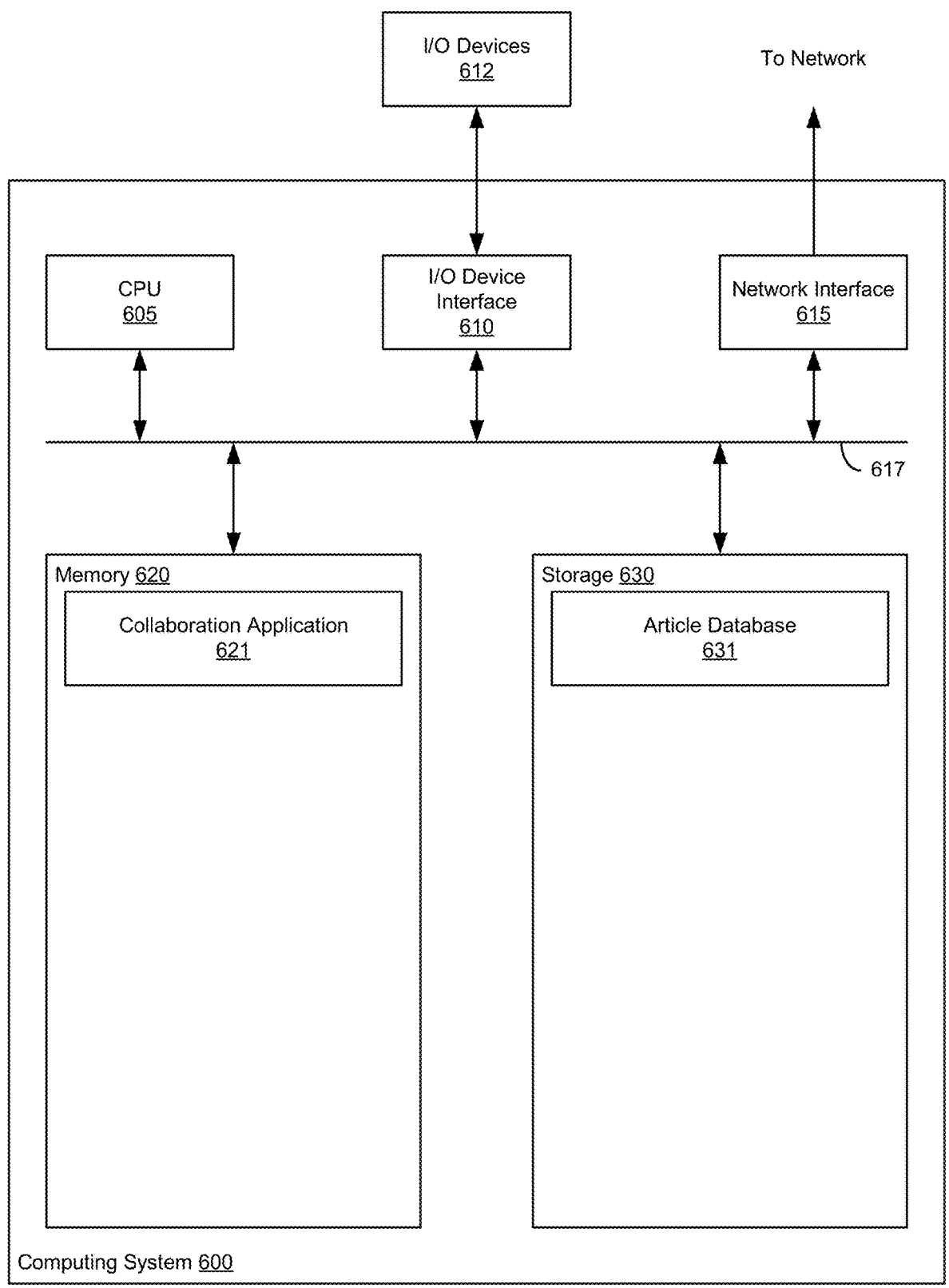
FIG. 6 illustrates an example computing system configured to publish a document to a social media provider at a point in time determined based on a maturity of an underlying topic on the social media provider, according to one embodiment.

FIG. 6 illustrates an example computing system 600 configured to publish a document to a social media provider at a point in time determined based on a maturity of an underlying topic on the social media provider, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a collaboration application 621. And storage 630 includes an article database 631. In one embodiment, the collaboration application 621 receives a given document (e.g., an article) from an individual for posting on one or more social networks. The collaboration application 621 may evaluate document properties (e.g., metadata associated with the document) and semantics of the document, allowing the collaboration application 621 to identify one or more topics to associate with the document. Once analyzed, the collaboration application 621 may store the document in the article database 631. In one embodiment, the article database 631 maintains documents, metadata associated with each of those documents (including topic data, such as tags), and summaries associated with each of those documents.

In one embodiment, the collaboration application 621 collects metrics from one or more social media providers, where each metric relates to a given topic associated with the document (e.g., strength, reach, and sentiment towards the topic). As stated, these metrics may be used to determine a measure of maturity of the topic on a social media provider. Such a measure allows the collaboration application 621 to identify a moment in the social media provider, using thresholds determined based on the collected metrics, provider-specific statistics, and topic history on the social media provider. For example, the collaboration application 621 may determine thresholds that a maturity measure for the topic should exceed on the social media provider prior to the collaboration application 621 publishing the article on the provider. The collaboration application 621 may also use such thresholds to determine that interest in a topic is increasing (although not yet matured) on a social media provider. In such a case, the collaboration application 622 may attempt to increase the maturity measure on the social media provider, e.g., by publishing a summary of the document to the social media provider.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the development operation information system manager) or related data available in the cloud. For example, the development operation information system manager could execute on a computing system in the cloud and evaluate developer source code against globalization enablement requirements set by a globalization architect of an enterprise network. In such a case, the development operation information system manager could detect deficiencies in developer source code with respect to globalization enablement source code and correct the deficiencies identified in the source code. Further, the development operation information could store verification test result logs at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A method, comprising:
    obtaining one or more metrics from each of a plurality of social media providers, wherein the metrics relate to a topic associated with a document for publishing on the social media providers;
    determining, for each of the social media providers, a measure indicating when to publish the document on the social media provider based on the metrics associated with that provider;
    upon determining that the measure exceeds a first threshold for at least one of the social media providers but does not exceed a higher, second threshold, publishing only a summary of the document to the social media provider at a first time period, wherein the summary is published to increase interest in the topic;
    upon determining that the measure exceeds the second threshold after publishing the summary, publishing the document to the at least one social media provider at a second time period occurring after the first time period, wherein the one or more metrics is included in a plurality of metrics obtained from each of the plurality of social media providers; and
    representing the plurality of metrics in an n-dimensional space, where n is the number of metrics collected, wherein the n-dimensional space comprises:

a first shape defined by a first surface representing first
intersections of values for the plurality of metrics,
wherein values in the n-dimensional space above the
first surface indicate that the topic has exceeded the
first threshold; and a second shape defined by a second surface representing second intersections of values for the plurality of
metrics, wherein values in the n-dimensional space
above the second surface indicate that the topic has
exceeded the second threshold.

2. The method of claim 1, wherein the document is associated with at least the summary and metadata.

3. The method of claim 1, further comprising:
identifying one or more trends in each social media
provider relating to the topic based on the one or more
metrics for the social media provider; and
reinforcing the measure based on the trends.

4. The method of claim 1, wherein the one of the metrics is at least one of a user reach, sentiment, and strength of the topic.

5. The method of claim 1, wherein the document is one of at least an article and a blog post.

6. A computer program product, comprising:
a computer-readable storage medium storing instructions,
which, when executed on a processor, performs an
operation, comprising:
obtaining one or more metrics from each of a plurality
of social media providers, wherein the metrics relate
to a topic associated with a document for publishing
on the social media providers,
determining, for each of the social media providers, a
measure indicating when to publish the document on
the social media provider based on the metrics
associated with that provider,
upon determining that the measure exceeds a first
threshold for at least one of the social media providers but does not exceed a higher, second threshold, publishing only a summary of the document to
the social media provider at a first time period,
wherein the summary is published to increase interest in the topic, and
upon determining that the measure exceeds the second
threshold after publishing the summary, publishing
the document to the at least one social media provider at a second time period occurring after the first
time period, wherein the one or more metrics is
included in a plurality of metrics obtained from each
of the plurality of social media providers; and
representing the plurality of metrics in an n-dimensional space, where n is the number of metrics
collected, wherein the n-dimensional space comprises:
a first shape defined by a first surface representing
first intersections of values for the plurality of
metrics, wherein values in the n-dimensional
space above the first surface indicate that the topic
has exceeded the first threshold; and
a second shape defined by a second surface representing second intersections of values for the
plurality of metrics, wherein values in the n-dimensional space above the second surface indicate
that the topic has exceeded the second threshold.

7. The computer program product of claim 6, wherein the document is associated with at least the summary and metadata.

8. The computer program product of claim 6, wherein the operation further comprises:

identifying one or more trends in each social media
provider relating to the topic based on the one or more
metrics for the social media provider; and
reinforcing the measure based on the trends.

9. The computer program product of claim 6, wherein the one of the metrics is at least one of a user reach, sentiment, and strength of the topic.

10. The computer program product of claim 6, wherein the document is one of at least an article and a blog post.

11. A system, comprising:
a processor; and
a memory storing program code, which, when executed
on the processor, performs an operation, comprising:
obtaining one or more metrics from each of a plurality
of social media providers, wherein the metrics relate
to a topic associated with a document for publishing
on the social media providers,
determining, for each of the social media providers, a
measure indicating when to publish the document on
the social media provider based on the metrics
associated with that provider,
upon determining that the measure exceeds a first
threshold for at least one of the social media providers but does not exceed a higher, second threshold, publishing only a summary of the document to
the social media provider at a first time period,
wherein the summary is published to increase interest in the topic; and
upon determining that the measure exceeds the second
threshold after publishing the summary, publishing
the document to the at least one social media provider at a second time period occurring after the first
time period, wherein the one or more metrics is
included in a plurality of metrics obtained from each
of the plurality of social media providers; and
representing the plurality of metrics in an n-dimensional space, where n is the number of metrics
collected, wherein the n-dimensional space comprises:
a first shape defined by a first surface representing
first intersections of values for the plurality of
metrics, wherein values in the n-dimensional
space above the first surface indicate that the topic
has exceeded the first threshold; and
a second shape defined by a second surface representing second intersections of values for the
plurality of metrics, wherein values in the n-dimensional space above the second surface indicate
that the topic has exceeded the second threshold.

12. The system of claim 11, wherein the document is associated with at least the summary and metadata.

13. The system of claim 11, wherein the operation further comprises:
identifying one or more trends in each social media
provider relating to the topic based on the one or more
metrics for the social media provider; and
reinforcing the measure based on the trends.

14. The system of claim 11, wherein the one of the metrics is at least one of a user reach, sentiment, and strength of the topic.

15. The method of claim 1, further comprising, before obtaining the one or more metrics:
identifying the topic associated with the document by
parsing text of the document using natural language
processing (NLP) techniques; and
upon determining the summary is not associated with the
document, generate the summary for the document by using NLP techniques to determining relevant sentences from the text to include in the summary.

16. The computer program product of claim 6, wherein the operation further comprises:
   identifying the topic associated with the document by parsing text of the document using NLP techniques; and
   upon determining the summary is not associated with the document, generate the summary for the document by using NLP techniques to determining relevant sentences from the text to include in the summary.

17. The system of claim 11, wherein the operation further comprises:
   identifying the topic associated with the document by parsing text of the document using NLP techniques; and
   upon determining the summary is not associated with the document, generate the summary for the document by using NLP techniques to determining relevant sentences from the text to include in the summary.

\* \* \* \* \*